March 13, 1962  J. W. KARAS  3,024,627
FLEXIBLE COUPLER
Filed March 2, 1961
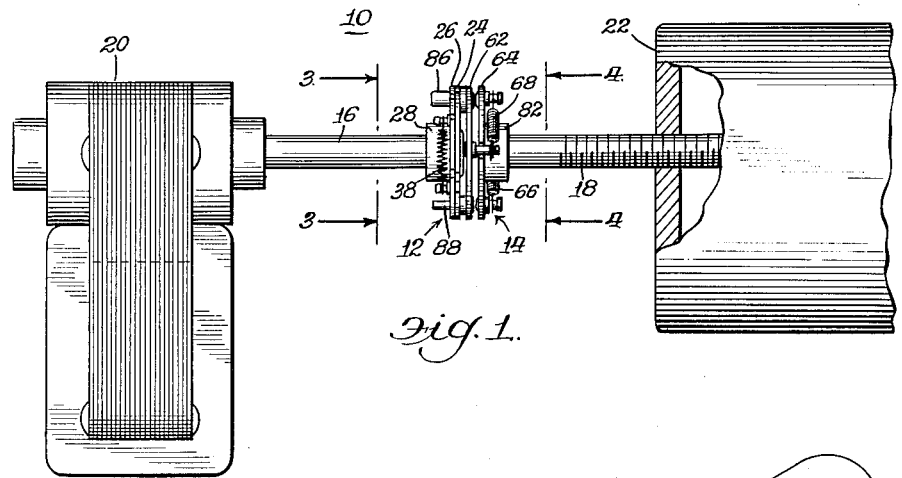
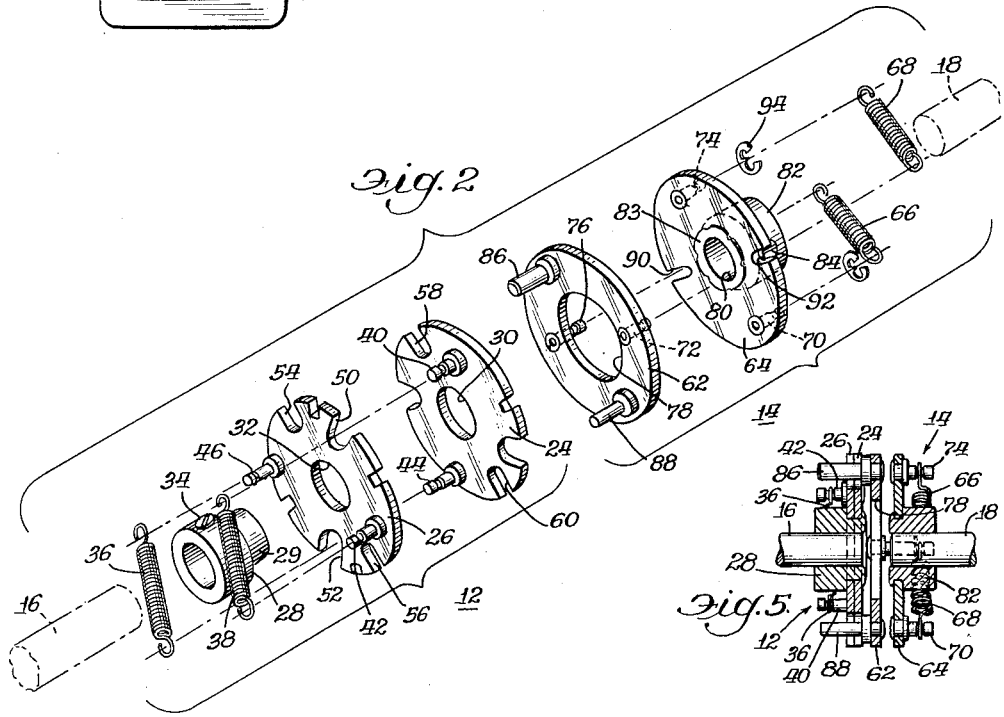
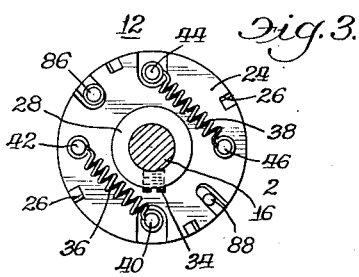
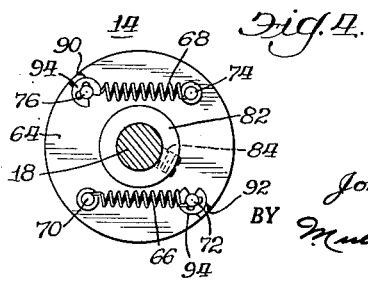
INVENTOR.
Joseph W. Karas
BY
Mueller & Aichele
Attys.

United States Patent Office 3,024,627
Patented Mar. 13, 1962

3,024,627
FLEXIBLE COUPLER
Joseph W. Karas, Park Ridge, Ill., assignor to Motorola, Inc., Chicago, Ill., a corporation of Illinois
Filed Mar. 2, 1961, Ser. No. 92,922
5 Claims. (Cl. 64—10)

This invention relates to shaft couplers and more particularly to a flexible coupler adapted to afford a constant velocity connection between two rotatable shafts which may be misaligned.

Various machines incorporate a mode of operation wherein torque is transmitted from a first shaft to a second shaft and wherein the shafts may be angularly displaced or in a misaligned axial position. In addition, it is often required that rotation of the first shaft in either direction be accurately transferred to the second shaft without backlash.

Most present day shaft coupling devices have the disadvantage that they are integrally constructed or at least constructed in such a way that the shafts may not be disengaged or separated without involving relatively complicated disassembly procedures. In many instances, when it is desired to couple two shafts such as those between a gear box and induction tuner, a relatively small, inexpensive designable coupling is desired which provides extremely accurate but limited rotation. Any backlash encountered when rotation is so limited will substantially affect performance.

It is therefore an object of the present invention to provide an inexpensive and improved shaft coupling device.

It is another object of the present invention to provide a simple coupling device for joining two misaligned shafts.

Another object of this invention is to provide a coupling between two adjacent shafts wherein backlash between the two is substantially reduced or eliminated.

Still another object of this invention is to provide a readily separable coupler between two adjacent shafts.

A feature of the present invention is the provision of a flexible shaft coupling device including a plurality of coil spring holding elements in engaged position to prevent backlash therebetween.

Another feature of the present invention is the provision of a shaft coupling device comprising male and female coupling members which are frictionally engaged and readily separable one from the other.

A further feature of this invention is the provision of two separable coupling members each comprising a pair of relatively movable disc shaped members fastened together by two coil springs, each anchored at one end to one of the discs and its other end to the second of said discs.

In the drawings:

FIG. 1 is a side elevational view of the coupler of the present invention;

FIG. 2 is an exploded view of the coupler of FIG. 1;

FIG. 3 is a cross sectional view taken on line 3—3 of FIG. 1;

FIG. 4 is a cross sectional view taken on line 4—4 of FIG. 1; and

FIG. 5 is a sectional view of the coupler of the present invention.

A coupler constructed in accordance with the present invention provides the means of drivingly connecting two rotatable shafts which may be misaligned. The coupler comprises basically male and female disc shaped drive members which, when coupled, are adapted to allow for angular and off-center misalignment of the shafts to be coupled and in addition provide for precise transfer of movement between devices. The present coupler is relatively small in size and in addition is polarized to prevent incorrect assembly. The individual shaft coupling members each comprise a pair of disc shaped members which are mounted upon the respective shafts by means of a hub secured to one of the pair of disc members. The two separate and relatively movable discs are held in locked relationship by means of a pair of coil springs connected at one end to each of the discs. Arms formed on the male member are received in slots in the female member to transmit movement therebetween. In operation, backlash is held to a minimum or completely prevented while a constant velocity is maintained between the shafts. In addition, the shafts may be angularly or axially displaced.

Referring now particularly to FIG. 1, the coupler of the present invention is indicated generally by the reference 10 and includes a first coupling member 12 and a second coupling member 14. The coupling members 12 and 14 couple to rotatable shafts 16 and 18 which may be angularly displaced or axially misaligned. These shafts 16 and 18 are shown connected to motor 20 and gear box 22 respectively. The coupling member 12 comprises a first disc 24 and a second disc 26. A hub 28 is suitably mounted within openings 30 and 32 formed in the discs 24 and 26. The hub 28 is rotatable within the opening 32 in the disc 26, and is fixed in the opening 30 of disc 24, so that the discs 24 and 26 may be rotatable with respect to each other. The discs 26 and 24 are axially fixed by virtue of their position within the area of reduced external diameter 29 formed in the hub 28. The hub 28 is adapted to be fastened upon one shaft 16 by means of a threaded screw 34.

Coil springs 36 and 38 are provided to eliminate backlash between the members 12 and 14. The coil spring 36 is anchored at one end to an anchor rod 40 and at its other end to anchor rod 42 (FIG. 3). The anchor rod 40 is mounted upon the disc 24 and the second anchor rod 44 is mounted upon the disc 26. The second coil spring 38 is also mounted between the discs 24, 26. Its one end is anchored to an anchor rod 44 which is mounted upon the disc 24 and its other end is anchored to rod 46 mounted upon disc 26. The rods 40 and 44 upon disc 24 fit through slots 50 and 52 which are formed in the outer peripheral edge of disc 26. The disc 26 is also formed with female slots 54 and 56, which are substantially aligned with female slots 58 and 60 formed in the disc 24.

The second coupling member 14 comprises a first disc 62 and a second disc 64. The coil springs 66 and 68 serve a function similar to springs 36 and 38. That is, the coil spring 66 is anchored at one end to the rod 70 and at its other end to the rod 72 which is mounted on the disc 62. The second coil spring 68 is mounted at one end of the rod 74 which is mounted upon the disc 64 and at its other end is anchored to the mounting rod 76 upon the disc 62 (FIG. 4).

It will be seen that the disc 62 is formed with an opening 78 of a substantially larger diameter than the opening 80 formed in the disc 64. A hub 82 is suitably mounted by pinch ring 83 within the opening 80 in the disc 64, wherein the pinch ring 83 grips the inner periphery of hub 82, and is adapted to be fixedly disposed upon the shaft 18 by means of mounting screw 84. Referring to the disc 62, the rods 86 and 88 are formed to fit into the slots 58—54 and 60—56 formed on the discs 24 and 26 of the coupling member 12. It will be noted that the rod 86 is substantially larger in diameter than rod 88. This is to facilitate assembly since each of the rods 86 and 88 are formed to fit into respective slots 58—84 and 60—56 each pair of which is also formed of a substantially different dimension to accommodate the rods 86 and 88. In this way the coupler is polarized so that it will not be assembled 180° out of position. Slots 90 and 92 are formed in the disc 64 to telescopically receive the anchor rods 72 and 76 therethrough which are mounted upon the disc 62. The hub 82 is fixed to the disc 64 by pinch ring 83 which grips the inner peripheral edge of the disc 64. Disc 62, which is formed, will have an opening substantially larger than the opening in disc 64, is axially and pivotally movable with respect to disc 64 upon rods 72 and 76 within the limits imposed by C washers 94 (FIG. 4). By virtue of this movement, axially and angularly displaced shafts may be coupled by the device. It will be seen that the discs 24 and 26 of coupling member 12 are rotatably misaligned by virtue of the pivotal force exerted by springs 36 and 38 so that slots 54—58 and the slots 56—60 are biased in a manner to a pinching force upon the rods 86 and 88 (FIG. 3).

The coupling manufactured in accordance with the present invention provides therefor a means of joining two rotatable shafts which may be misaligned and/or angularly displaced with respect to one another. A constant velocity may be maintained while backlash is eliminated by means of a spring bias double disc arrangement. The coupling is easily separable requiring no complex disassembly procedures. In addition to this, because of the particular application suggested, the coupler, by virtue of its relative simplicity, may be small in size, and inexpensive to manufacture.

I claim:

1. A flexible coupler adapted to join two shafts including in combination, a first shaft coupling member comprising a first disc and a second disc whereby said first disc is pivotable about the axis of said second disc and axially movable with respect thereto, spring means adapted to fasten said first disc upon said second disc, means adapted to mount said first shaft coupling member upon one of the shafts, a second shaft coupling member comprising a first disc and a second disc wherein said second disc is pivotable about the axis of said first disc, spring means adapted to fasten said first disc to said second disc, means adapted to mount said second shaft coupling member upon the second shaft, and means adapted to removably secure said first shaft coupling member to said second shaft coupling member and cooperating with said spring means to prevent backlash between said first and second shaft coupling members.

2. A flexible coupler adapted to join two rotatable shafts including in combination, a first shaft coupling member comprising first and second discs wherein said first disc is pivotally mounted upon said second disc, spring means anchored at one end upon said first disc and at its other end upon said second disc to mount said first disc to said second disc and resist rotation therebetween, said first and said second discs formed with a plurality of slots in the outer peripheral edges thereof and having an opening formed in the centers thereof, a first hub adapted to be fixedly mounted upon the first shaft, said first shaft coupling member fixedly mounted over said hub wherein said hub is disposed within said openings, a second shaft coupling member comprising a first and a second disc member wherein said first disc is pivotally mounted upon said second disc and axially movable with respect thereto, spring means anchored at one end to said first disc and at its other end thereof to said second disc to resist rotation therebetween, a plurality of axially outwardly extending arms formed upon said first disc adapted to be frictionally engaged within said slots, a second hub adapted to be fixedly mounted upon said second shaft, said second shaft coupling member disposed upon said second hub wherein said second hub is fitted within said second shaft coupling member opening.

3. A coupler adapted to join two misaligned rotatable shafts including in combination, a first shaft coupling member comprising a first disc and a second disc, means adapted to maintain said first disc mounted upon said second disc in pivotal relationship, said last named means comprising a plurality of coil springs each having one end disposed upon said first disc and its other end disposed upon said second disc, said first named disc formed with a radially outwardly extending hub portion, said second disc formed with an opening in the center thereof of substantially larger diameter than said hub member, a second shaft coupling member comprising a first substantially disc shaped member having a radially outwardly extending hub portion formed in the center thereof, said second disc having an opening formed in the center thereof substantially in alignment with said hub, a plurality of slots formed in said first and said second disc members, means adapted to fasten said first and said second disc members together and further adapted to allow a predetermined rotation therebetween, said last named means comprising a plurality of coil springs each being anchored at one end upon said first disc and at its other end upon said second disc, whereby said radially outwardly extending arms upon said first shaft coupling member are frictionally mounted within said slots and whereby said coupling prevents backlash between said first and said second misaligned rotatable shafts while affording a constant velocity drive therebetween.

4. A flexible coupler adapted to join two rotatable shafts including in combination a first shaft coupling member comprising a first and a second disc member, each of said discs formed with an opening in the center thereof, a hub portion adapted to be frictionally received within said openings, a plurality of coil springs anchored at one end upon said first disc and at their other end upon said second disc, said disc formed with a plurality of radially inwardly extending slots in the peripheral edges thereof, wherein said spring means forces said first disc to a position wherein said slots are substantially out of alignment, a second shaft coupling member comprising a first and a second disc shaped member each formed with an opening in the center portion thereof and mounted together whereby said first disc is axially movable with respect to said second disc, a plurality of springs having one end anchored to said first disc and the other ends thereof anchored to said second disc, a hub member adapted to be fixedly mounted upon the second shaft, said hub member fixedly disposed within said opening in said second shaft coupling member, a plurality of radially outwardly extending arms formed on said second disc adapted to be frictionally received within said slots in said first coupling member, whereby said flexible coupling prevents backlash between the first and second misaligned rotatable shafts while affording a constant velocity drive therebetween.

5. A coupling adapted to join two radially misaligned and angularly displaced rotatable shafts including in combination, a first shaft coupling member comprising a first and a second disc member, each of said discs being formed with an opening in the center portion thereof, a hub member adapted to be frictionally held within said first disc opening and further adapted to be fixedly disposed upon one of the misaligned rotatable shafts, each of said discs being formed with a pair of radially outwardly extending rods thereon, a pair of coil springs each having one end anchored upon said first rod and its other end anchored upon said second rod, said first rod extending through slots formed in said second disc whereby said second disc is movably mounted upon said first disc whereby said springs restrain rotatable movement therebetween, a pair of radially inwardly extending slots formed in the peripheral edges of said first and second discs, a second shaft coupling member comprising a first and a second disc member, each of said disc members being formed with an opening in the center portion thereof whereby the opening in said second disc is of a substantialy greater diameter than the opening in said first disc, a pair of anchor rods formed upon said first and said second discs, a pair of coil springs each having one end anchored upon said first disc rod and its other end anchored upon said second disc rod, a hub portion frictionally held within said first disc opening and adapted to be fixedly mounted upon the second misaligned rotatable shaft, a plurality of radially outwardly extending arms formed on said second disc and adapted to be frictionally held within said peripheral slots in said first coupling member, whereby said coupling joins two misaligned shafts and prevents backlash therebetween while affording a constant velocity drive therebetween.

References Cited in the file of this patent

UNITED STATES PATENTS

| | | |
|---|---|---|
| 2,371,507 | Davis | Mar. 13, 1945 |
| 2,430,449 | Brown | Nov. 11, 1947 |
| 2,551,328 | Kingman | May 1, 1951 |
| 2,784,574 | Gelder | Mar. 12, 1957 |

FOREIGN PATENTS

| | | |
|---|---|---|
| 659,302 | Great Britain | Oct. 24, 1951 |